United States Patent
Hendler et al.

(10) Patent No.: US 10,017,051 B2
(45) Date of Patent: Jul. 10, 2018

(54) TANK FILLER NECK FOR A VEHICLE WITH IMPROVED SEALING

(71) Applicant: MAGNA STEYR Fuel Systems GesmbH, Sinabelkirchen (AT)

(72) Inventors: René Hendler, Graz (AT); Bernd Kahler, Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 69 days.

(21) Appl. No.: 15/200,891

(22) Filed: Jul. 1, 2016

(65) Prior Publication Data

US 2017/0001515 A1 Jan. 5, 2017

(30) Foreign Application Priority Data

Jul. 1, 2015 (EP) ..................................... 15174772

(51) Int. Cl.
*B65B 1/04* (2006.01)
*B60K 15/04* (2006.01)

(52) U.S. Cl.
CPC ........ *B60K 15/04* (2013.01); *B60K 2015/047* (2013.01); *B60K 2015/048* (2013.01); *B60K 2015/0477* (2013.01)

(58) Field of Classification Search
CPC ............. B60K 15/04; B60K 2015/047; B60K 2015/0477; B60K 2015/048
See application file for complete search history.

(56) References Cited

U.S. PATENT DOCUMENTS

2015/0246610 A1* 9/2015 Kito ..................... B60K 15/04
220/86.1

FOREIGN PATENT DOCUMENTS

| CN | 101142104 A | 3/2008 |
|---|---|---|
| CN | 201415942 Y | 3/2010 |
| CN | 103253125 A | 8/2013 |
| CN | 104512242 A | 4/2015 |
| DE | 3027002 A1 | 2/1982 |
| DE | 102011105197 A1 | 12/2012 |
| WO | 2006/097515 A1 | 9/2006 |

OTHER PUBLICATIONS

Office Action for Chinese Patent Application No. 201610490587.8, dated Feb. 1, 2018, 9 pages including 5 pages of English translation.

* cited by examiner

*Primary Examiner* — Jason K Niesz
(74) *Attorney, Agent, or Firm* — Jordan IP Law, LLC; Todd A. Vaughn

(57) ABSTRACT

A tank filler neck for a motor vehicle, and a motor vehicle having such a tank filler neck. The tank filler neck includes a plastic tube, a filler head composed of metal to enclose the plastic tube at an end thereof, and a first seal composed of an elastomer arranged on the circumference between the plastic tube and the filler head; a first seal composed of an elastomer, and which is arranged circumferentially between the first tube and the filler head; and a first supporting ring arranged opposite to the first seal in relation to the first tube, wherein the first supporting ring has a wall thickness that is greater than a wall thickness of the filler head.

17 Claims, 1 Drawing Sheet

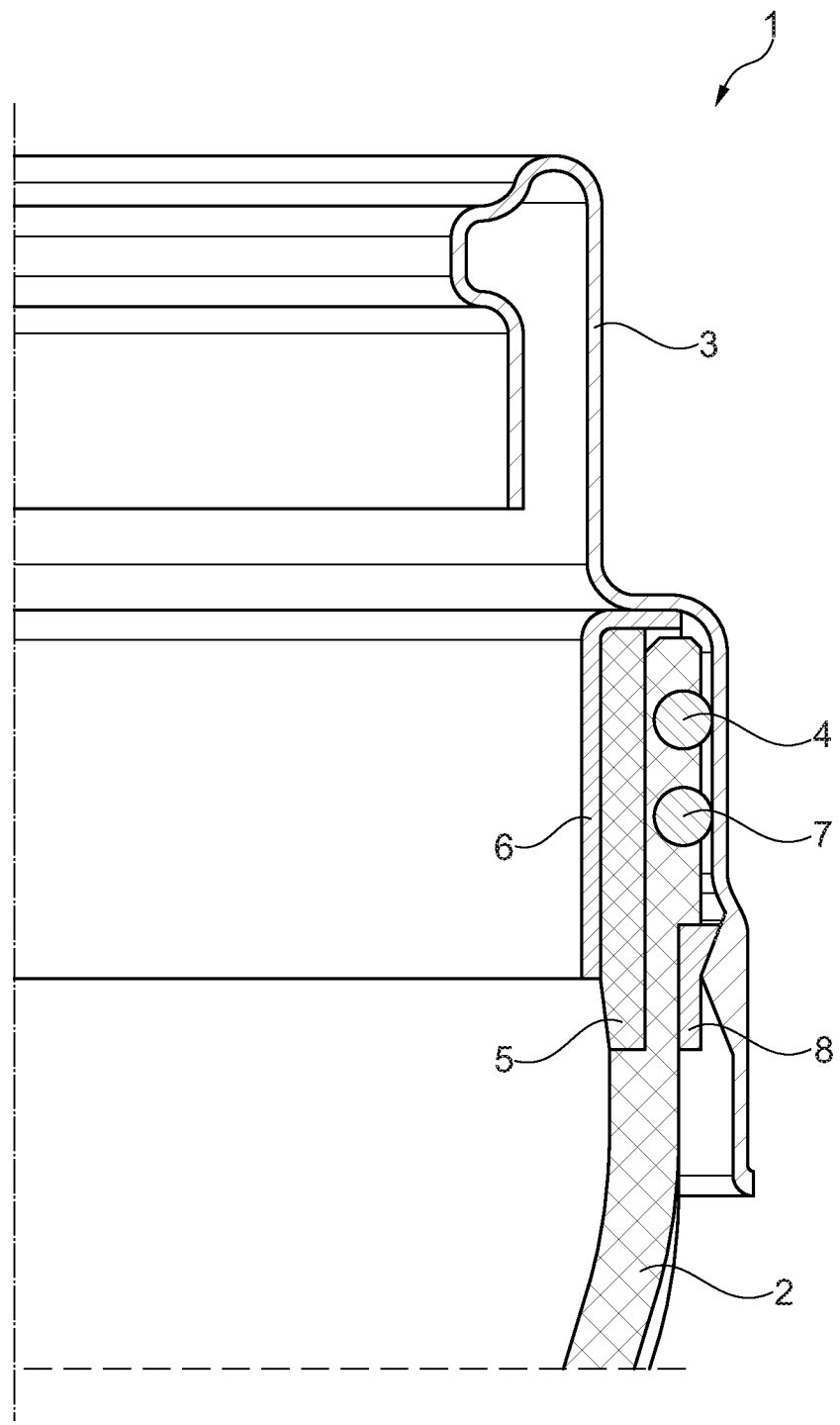

TANK FILLER NECK FOR A VEHICLE WITH IMPROVED SEALING

CROSS-REFERENCE TO RELATED APPLICATIONS

The present application claims priority 35 U.S.C. § 119 to European Patent Publication No. EP 15174772.2 (filed on Jul. 1, 2015), which is hereby incorporated by reference in its complete entirety.

TECHNICAL FIELD

Embodiments relate to a tank filler neck for a motor vehicle, and a motor vehicle having such a tank filler neck. The tank filler neck includes a plastic tube, a filler head composed of metal to enclose the plastic tube at an end thereof, and a first seal composed of an elastomer arranged on/over the circumference between the plastic tube and the filler head.

BACKGROUND

A filler neck and a motor vehicle having a filler neck are fundamentally known from the prior art. For example, German Patent Publication No. DE 30 27 002 A1 discloses a tank filler neck arrangement for this purpose, in particular for motor vehicles. A filler neck composed of plastic and a closure base composed of metal in a concentric arrangement. The filler neck is enclosed by the closure base with pressure. For this purpose, the filler neck is supported by an inner supporting sleeve which lies under the closure base. Moreover, a ring seal which is active between both parts is arranged in a receiver in the closure base or the filler neck.

The different materials used for the filler neck have different material properties (e.g. thermal expansion coefficients, swelling characteristics as a result of the action of fuel, etc.). As a result of the influence of the fuel and/or as a result of the influence of higher temperatures, both the filler neck and also the seal may swell up and partially significantly deform over time, as a result of which tolerances are exceeded/undershot and leaks, in particular in the region of the ring seal, may arise. The imperviousness of the system may then no longer be ensured with adequate quality. In particular, stricter legal requirements in terms of hydrocarbon emissions in the case of fuel tanks cannot be satisfied over the entire lifetime of a motor vehicle.

SUMMARY

Embodiments relate to an improved tank filler neck and an improved motor vehicle having such a tank filler neck. In particular, the emissions of hydrocarbons from the fuel tank should be reduced in comparison to the prior art.

Embodiments relate to a tank filler neck that includes at least one of the following: a plastic tube; a filler head composed of metal to enclose the plastic tube at an end thereof; a first seal composed of an elastomer arranged on/over the circumference between the plastic tube and the filler head; a first supporting ring arranged opposite the first seal in relation to the plastic tube, and which has a greater wall thickness than the filler head. The first supporting ring may be composed, for example, of metal or plastic, in particular fibre-reinforced plastic.

In accordance with embodiments, a motor vehicle may include at least one of the following: a tank filler neck that includes at least one of the following: a plastic tube; a filler head composed of metal to enclose the plastic tube at an end thereof; a first seal composed of an elastomer arranged on/over the circumference between the plastic tube and the filler head; a first supporting ring arranged opposite the first seal in relation to the plastic tube, and which has a greater wall thickness than the filler head. The first supporting ring may be composed, for example, of metal or plastic, in particular fibre-reinforced plastic.

The fixing of the filler head on the plastic tube may be stabilized by the use of the first supporting ring. The plastic tube arranged between the filler head and the first supporting ring may not deform or may only barely deform as a result of swelling and/or temperature influence.

Due to the fact the first supporting ring has a greater wall thickness than the filler head, the first supporting ring may also be considered to be a more or less rigid framework from which any potential deformation proceeds in the direction of the filler head. In other words, the diameter of the comparatively solid, first supporting ring also remains more or less constant in the event of a deformation of the plastic tube. As a result, in the case of an expansion of the plastic tube and/or the first seal, a high surface pressure is achieved between the plastic tube, the filler head and the first seal. This is particularly true if the filler head has one or more shoulders and/or corrugations, in particular in the region of the first seal. As a result, the filler head is also comparatively rigid and provides great resistance to an expansion of the plastic tube.

In German Patent Publication No. DE 30 27 002 A1, this action is in contrast "lost" since the inner tube used there is thin-walled and flexible. Overall, the imperviousness of the tank filler neck may be significantly improved by the proposed measures, and the hydrocarbon emissions may be correspondingly reduced. The first seal may be produced in particular from a rubber and/or be formed as an O-ring.

In accordance with embodiments, it is expedient if the filler head and the first seal are arranged on the outer side of the plastic tube and the first supporting ring on the inner side of the plastic tube. As a result, the tank filler neck may be effectively sealed off from escaping hydrocarbons.

In accordance with embodiments, it is also expedient in the above context if the tank filler head has an inner tube composed of metal which is arranged inside the first supporting ring. As a result, the plastic tube may be further stabilized and protected on the inside in particular from damage during the filling process. The inner tube may especially also be formed as a streamlining device ("flowguide") for the fuel so that a blow back or spraying out of the fuel do not occur during the filling process.

In accordance with embodiments, it is, however, also expedient if the filler head and the first seal are arranged on the inner side of the plastic tube and the first supporting ring on the outer side of the plastic tube. In this manner, the tank filler neck may also be sealed off from escaping fuel and/or escaping hydrocarbons.

In accordance with embodiments, in a further advantageous formation of the tank filler head, the tank filler head has a second seal composed of an elastomer (in particular, of a rubber material) which is arranged next to the first seal. In particular, the second seal, like the first seal, is arranged on the outer side of the plastic tube and formed, for example, as an O-ring.

The sealing action of the entire system may be improved with the aid of the second seal. If the second seal is arranged on the tank side in relation to the first seal, the influence of fuel or hydrocarbons on the first seal is reduced by the proposed measures since fuel and hydrocarbons may only to a very limited extent reach the first seal through the sealing gap of the second seal. The life span of the first seal or its sealing action is significantly improved as a result. It should be noted at this point that the provision of a second seal is not necessarily bound to the existence of a first supporting ring, rather the second seal may also form the basis of a separate embodiment.

In accordance with embodiments, it is particularly advantageous if the first seal is manufactured from fluorocarbon rubber (FKM) and the second seal from acrylonitrile butadiene rubber (NBR) or vice versa. By combining the two materials, an imperviousness of the system may be ensured over a wide temperature range. NBR is temperature-resistant to around +120° C., whereas FKM has temperature resistance of up to approx. +200° C.

In accordance with embodiments, in a further particularly advantageous embodiment of the tank filler neck, the tank filler neck has a second supporting ring which is arranged opposite the first supporting ring in relation to the plastic tube. The second supporting ring may be composed, for example, of metal or plastic, in particular of fibre-reinforced plastic. A deformation of the plastic tube may be yet further curtailed or even prevented with the aid of the second supporting ring. This feature is also not necessarily bound to the existence of a thick-walled first supporting ring, rather the second supporting ring may also form the basis of a separate embodiment.

In accordance with embodiments, it is expedient in the above context if the second supporting ring is arranged between the plastic tube and filler head. As a result, the plastic tube may be further stabilized.

In accordance with embodiments, it is, however, also expedient if the filler head is arranged between the plastic tube and the second supporting ring. In this manner, an expansion of the plastic tube leads to an increase in surface pressure between the filler head and the plastic tube and thus to improved sealing off of the entire system.

In accordance with embodiments, it is finally expedient if the filler head is formed as a sheet-metal formed part. As a result, the filler head may be produced in a simple manner.

The above configurations and further developments of embodiments may be combined in any desired manner.

DRAWINGS

Embodiments will be illustrated by way of example in the drawings and explained in the description below.

FIG. 1 illustrates a tank filler neck for a motor vehicle in half-section, in accordance with embodiments.

DESCRIPTION

FIG. 1 illustrates a tank filler neck 1 for a motor vehicle, comprising a tube 2 which may be composed of plastic, a filler head 3 which may be composed of metal to enclose the tube 2 at an end thereof, and a first seal 4 composed of an elastomer, in particular of a rubber, and arranged on the circumference between the tube 2 and the filler head 3. The filler head 3 is, in this example, formed as a sheet-metal formed part, but may in principle also be produced in a different manner.

The tank filler neck 1 also comprises a first supporting ring 5 which is arranged concentrically opposite the first seal 4 in relation to the tube 2, and which has a greater wall thickness than the filler head 3. The first supporting ring 5 may be composed, for example, of metal or plastic, in particular of fibre-reinforced plastic.

The fixing of filler head 3 on plastic tube 2 is stabilized by the use of first supporting ring 5. Due to the fact that first supporting ring 5 has a greater wall thickness than filler head 3, the diameter of first supporting ring 5 also remains more or less constant in the case of a deformation of plastic tube 2, and in the case of an expansion of plastic tube 2 and/or first seal 4, a high surface pressure is achieved between plastic tube 2, filler head 3 and first seal 4. This is particularly true if filler head 3 has one or more shoulders and/or corrugations, in particular in the region of first seal 4, as is the case in the represented example. As a result, filler head 3 is also comparatively rigid and provides great resistance to an expansion of plastic tube 2.

The filler head 3 and the first seal 4 are arranged on an outer side of the tube 2, while the first supporting ring 5 is on an inner side of the tube 2. As a result, sealing off is particularly effective in terms of hydrocarbons which penetrate in particular in the gap between the tube 2 and the filler head 3 from the inner side to the first seal 4.

Alternatively or additionally, the tank filler neck 1 also comprises an inner tube 6 composed of metal which is concentrically arranged inside the first supporting ring 5. As a result, the tube 2 may be further stabilized and protected on the inside in particular from damage during the filling process. The inner tube 6 may especially also be formed as a streamlining device ("flowguide") for the fuel so that a blow back or spraying out of the fuel do not occur during the filling process. It would generally also be conceivable that the filler head 3 and the first seal 4 are arranged on the inner side of the tube 2 and the first supporting ring 5 on the outer side of the tube 2.

The tank filler neck 1 also has an optional second seal 7 composed of an elastomer (in particular also of a rubber), and which arranged adjacent to the first seal 4. The second seal 7 is also arranged on the outer side of the tube 2. The sealing action of the entire system may thus be advantageously improved. In particular, as a result, the influence of fuel or hydrocarbons on the first seal 4 is reduced since fuel and hydrocarbons may only to a very limited extent reach the first seal 4 through the sealing gap of the second seal 7. The life span of the first seal 4 or its sealing action is significantly improved as a result.

It is particularly advantageous if the first seal 4 is manufactured from fluorocarbon rubber (FKM) and the second seal 7 from acrylonitrile butadiene rubber (NBR), or vice versa. By combining the two materials, an imperviousness of the system may be ensured over a wide temperature range. NBR is temperature-resistant to around +120° C., whereas FKM has temperature resistance up to approx. +200° C.

Alternatively or additionally, the tank filler neck 1 in accordance with embodiments may also have an outer or second supporting ring 8 which is arranged opposite the inner or first supporting ring 5 in relation to the tube 2. The tube 2 may be further stabilized as a result. The second supporting ring 8 may, like the first supporting ring 5, be produced, for example, from metal or plastic, in particular from fibre-reinforced plastic. The second supporting ring 8 is arranged between the tube 2 and the filler head 3. It would, however, also be conceivable that the filler head 3 is arranged between the tube 2 and the second supporting ring 8. In this manner, an expansion of the tube 2 leads to an increase in surface pressure between the filler head 3 and the tube 2, and thus, to improved sealing off of the entire system.

It should finally be noted that the components in the figure may not be represented true-to-scale. Positional indications such as "right", "left", "top", "bottom" and the like relate to the represented position of the respective component and may notionally be correspondingly adapted in the event of a change of the stated position. It should furthermore be noted that represented tank filler neck 1 may of course have more or fewer components than represented without departing from the basic concept of the present invention as a result.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A tank filler neck for a motor vehicle, comprising:
a first tube composed of a plastic;
a filler head composed of metal, and which is to enclose the first tube at an end thereof;
a first seal composed of an elastomer, and which is arranged circumferentially between the first tube and the filler head;
a first supporting ring arranged opposite to the first seal in relation to the first tube, wherein the first supporting ring has a wall thickness that is greater than a wall thickness of the filler head; and
a second supporting ring which is arranged opposite the first supporting ring in relation to the first tube.

2. The tank filler neck of claim 1, wherein:
the filler head and the first seal are arranged on an outer side of the first tube; and
the first supporting ring is arranged on an inner side of the first tube.

3. The tank filler neck of claim 2, further comprising a second tube composed of metal which is arranged inside the first supporting ring.

4. The tank filler neck of claim 1, further comprising a second seal composed of an elastomer, and which is arranged adjacent to the first seal.

5. The tank filler neck of claim 4, wherein:
the first seal comprises fluorocarbon rubber; and
the second seal comprises acrylonitrile butadiene rubber.

6. The tank filler neck of claim 4, wherein:
the first seal comprises acrylonitrile butadiene rubber; and
the second seal comprises fluorocarbon rubber.

7. The tank filler neck of claim 1, wherein the second supporting ring is arranged between the first tube and the filler head.

8. The tank filler neck of claim 1, wherein the filler head is arranged between the first tube and the second supporting ring.

9. The tank filler neck of claim 1, wherein the first supporting ring and/or the second supporting ring comprise a metal.

10. The tank filler neck of claim 1, wherein the first supporting ring and/or the second supporting ring comprise a plastic.

11. The tank filler neck of claim 1, wherein the filler head is formed as a sheet-metal formed part.

12. A motor vehicle, comprising:
a tank filler neck including:
a first tube composed of a plastic;
a filler head composed of metal, and which is to enclose the first tube at an end thereof;
a first seal composed of an elastomer, and which is arranged circumferentially between the first tube and the filler head;
a first supporting ring arranged opposite to the first seal in relation to the first tube, wherein the first supporting ring has a wall thickness that is greater than a wall thickness of the filler head; and
a second supporting ring which is arranged opposite the first supporting ring in relation to the first tube.

13. The motor vehicle of claim 12, further comprising a second tube composed of metal which is arranged inside the first supporting ring.

14. The motor vehicle of claim 12, further comprising a second seal composed of an elastomer, and which is arranged adjacent to the first seal.

15. The motor vehicle of claim 12, wherein the second supporting ring is arranged between the first tube and the filler head.

16. The motor vehicle of claim 12, wherein the filler head is arranged between the first tube and the second supporting ring.

17. A motor vehicle, comprising:
a tank filler neck including:
a first tube;
a filler head to enclose the first tube at an end thereof;
a first seal arranged circumferentially between the first tube and the filler head;
a first supporting ring arranged opposite to the first seal in relation to the first tube, wherein the first supporting ring has a wall thickness that is greater than a wall thickness of the filler head; and
a second supporting ring arranged opposite the first supporting ring in relation to the first tube.

* * * * *